United States Patent
Gerresheim et al.

[11] Patent Number: 5,942,069
[45] Date of Patent: Aug. 24, 1999

[54] METHOD OF MANUFACTURING TIRE

[75] Inventors: Manfred Gerresheim, Obertshausen; Eduard Ditzel; Jurgen Schomburg, both of Rodenbach; Wilhelm Endres, Hasselroth; Hubert Leinweber, Hanau, all of Germany

[73] Assignee: SP Reifenwerke GmbH., Hanau, Germany

[21] Appl. No.: 08/575,613

[22] Filed: Dec. 20, 1995

[30]   Foreign Application Priority Data

Dec. 21, 1994 [DE] Germany .......................... 44 45 758

[51] Int. Cl.⁶ .......................... B29D 30/52; B60C 1/00; B60C 11/00; B60C 19/08
[52] U.S. Cl. .......................... 156/128.1; 152/152.1; 152/209 R; 152/DIG. 2; 156/129
[58] Field of Search .......................... 152/209 R, 209 D, 152/151, 152.1, DIG. 2; 156/126, 127, 128.1, 128.6, 129

[56]         References Cited

U.S. PATENT DOCUMENTS

| 2,339,546 | 1/1944 | Hanson | 152/DIG. 2 |
| 2,342,576 | 2/1944 | Fielding | 152/DIG. 2 |
| 2,445,725 | 7/1948 | Walker | 152/209 R |
| 3,753,821 | 8/1973 | Ragen | 156/129 |
| 3,768,537 | 10/1973 | Hess et al. | 152/209 R |
| 3,884,285 | 5/1975 | Russell et al. | 152/209 R |
| 4,308,083 | 12/1981 | Toth | 156/129 |
| 4,580,608 | 4/1986 | Rampl . | |
| 4,739,811 | 4/1988 | Rampl . | |
| 5,397,616 | 3/1995 | Aoki et al. | 152/209 R |
| 5,518,055 | 5/1996 | Teeple et al. | 152/152.1 |

FOREIGN PATENT DOCUMENTS

| 228177 | 12/1958 | Australia | 152/152.1 |
| 341187 | 11/1989 | European Pat. Off. | 152/209 R |
| 0106838 | 4/1994 | European Pat. Off. . | |
| 0658452 | 6/1995 | European Pat. Off. . | |
| 681931 | 11/1995 | European Pat. Off. | 152/DIG. 2 |
| 705722 | 4/1996 | European Pat. Off. | 152/DIG. 2 |
| 718126 | 6/1996 | European Pat. Off. | 152/DIG. 2 |
| 793507 | 1/1936 | France | 152/151 |
| 4232004 | 3/1994 | Germany . | |
| 47202 | 12/1977 | Japan | 152/DIG. 2 |
| 597008 | 3/1978 | Switzerland | 152/152.1 |
| 544757 | 4/1942 | United Kingdom | 152/DIG. 2 |
| 551657 | 3/1943 | United Kingdom . | |

OTHER PUBLICATIONS

Translation of Japan 52–47202, Dec. 1, 1977.

*Primary Examiner*—Steven D. Maki
*Attorney, Agent, or Firm*—Birch, Stewart, Kolasch & Birch, LLP

[57]         ABSTRACT

A pneumatic vehicle tire comprising a tread strip which forms the tire tread and is made from an electrically insulating or poorly conducting material and comprising, beneath the tread strip, a layer which is a good electrical conductor wherein, in order to bring about an adequate dissipation of electrical charge from the vehicle bodywork, the layer which is of good electrical conductivity extends at least regionally up to and into the tire running surface when considered over the circumference of the tire.

1 Claim, 8 Drawing Sheets

METHOD OF MANUFACTURING TIRE

The present invention relates to a vehicle tire having a tread strip which forms the tire running surface and is made from an electrically insulating or poorly conducting material and having, beneath the tread strip, a layer which conducts electricity well and/or another tire component which conducts electricity well.

BACKGROUND OF THE INVENTION

In vehicle tires, many criteria must be simultaneously satisfied, in particular wet grip characteristics, behavior when travelling around curves, fast running characteristics and durability should in each case be ideal. These characteristics in particular are especially good when a rubber mixture is used for the tread strips of vehicle tires which is commonly called a "silica mixture". This is a rubber mixture with a high proportion of silicic acids.

The disadvantage of such rubber mixtures with a high proportion of silicic acid lies in the fact that these are not electrically conductive or only poorly electrically conductive and the bodywork of a vehicle equipped with such tires can charge up electrically due to lack of an electrical connection to the road or carriageway. This can go so far that spark discharges occur when, for example, the driver of the motor vehicle wishes to open the filler cap at a filling station. This is naturally extremely dangerous and must be avoided at all cost. A poor or non-existent dissipation of electrical charge from the vehicle bodywork however also has further less dramatic disadvantages. Thus, for example, crackling noises occur in the car radio when driving over expansion joints or bridges or metallic sewer covers. These side effects of silica treads are less desirable.

SUMMARY OF THE INVENTION

The invention is thus based on the object of setting forth a pneumatic vehicle tire of the initially named kind which does not have these disadvantages. In particular, an adequate dissipation of electrical charges from the vehicle bodywork to the road should be ensured in order to prevent an electrostatic charging up of the vehicle bodywork.

This object is satisfied in such a tire, in accordance with the invention, in that the layer of the vehicle tire which is a good electrical conductor has radially projecting extensions which are good electrical conducts extending up to and into the tire running surface from the layer.

This design ensures that during rolling of the tire a component of the tire which conducts electrically well has a contact to the road or carriageway at least once per tire revolution. This is sufficient in order to ensure an adequate conduction of electrical charge from the vehicle bodywork to the road and to prevent the bodywork charging up electrostatically. The dissipation thereby takes place via the layer which conducts electricity well and via the tire sub-construction, which likewise conducts electricity well and which is in connection with the vehicle bodywork via the rim.

Thus, in accordance with the invention, provision is made for the conduction of electricity between the vehicle bodywork and the carriageway which prevents charging up of the vehicle bodywork electrostatically. The tread base layer which consists of a customary rubber mixture which conducts electricity well is preferably considered for the electrically well conducting layer. This tread base layer is preferably so designed that it extends radially outwardly at least regionally through the tread strip and forms a part of the tire tread. These regions can be kept small since it is sufficient, as mentioned above, when the possibility of an electrical connection between the bodywork and the carriageway is provided one per tire revolution. The positive characteristics of the tread strip of a silica mixture thereby remain practically unchanged.

The extension of the tread base layer through the tread strip may be achieved during joint molding, for example injection molding, of the tread base and of the tread strip, or at a later stage during molding of the tread pattern. In both the first case and also in the second case the penetration of the tread strip by the tread base is achieved through corresponding molding of the injection nozzles and in each case the flow processes are taken into account during molding of the tread pattern. Thus, in both cases, no additional manufacturing step is necessary.

The extensions or parts of the tread base which extend through the tread strip can lie in the finished tire completely inside raised tread pattern regions or can also lie in transition regions between raised tread pattern regions and in tread pattern recesses. In both cases the electrical contact to the road or carriageway is not impaired by the wear of the tire but is rather maintained over the entire life of the tire.

Furthermore, the extensions or parts of the tread base which extend through the tread strip can be provided in the axially central region of the tire and/or in the shoulder region of the tire. They can extend along the entire tire circumference, and thus represent a band which extends in the tread surface, or can be present only section-wise in the circumferential direction of the tire or can indeed only be present in quasi point-like regions. It is important, as has already been explained, that a part of the tread base enters into contact with the carriageway at least once per tire revolution.

In order to ensure this, the tread strip can also have one or more strips of material which conducts electricity well at the radially outer side which are electrically connected to the tread base. The electrical connection can, for example, take place through retrospective through-contacting of the strips to the tread base. The strips can likewise already have been molded into the tread strips during the injection molding thereof.

In a further design of the invention, the tire elements which are normally called wings, and which are arranged in the transition region between the tire shoulder and the side parts of the tire, are formed of material which conducts electricity well. At least one of the wings can then extend at least section-wise into the tire tread and thus form a part of the tire tread. In this way the wings enable a dissipation of electrical charge from the bodywork to the carriageway since they are connected at one side to the tire sub-construction which conducts electricity well.

An extension of a wing can for example be brought about in that at least one of the wings runs out towards the circumferential central plane of the tire into a thin skin which covers over at least the shoulder region of the tire. A design of this kind can preferably be achieved by joint injection molding of the wings and the tread strip through suitable dimensioning of the boundary surface between the wing and the tread strip. Through corresponding molding of the injection molding nozzles it is ensured that the wing material is drawn as a thin skin over the tread strip. The wing material, so to say, floods the tread strip material at the outer side of the tire during injection molding.

During subsequent molding of the tire profile, this thin skin is then pressed into the profile grooves which are thereby formed. In this way, this skin of electrically conductive material is also present, in particular, at the side walls of inclined grooves or transverse grooves which open out into the axially outer sides of the tire. In this manner, a permanent electrical connection between running surface and wing is ensured, since even when the tire pattern wears down the skin of electrically well conducting material always extends along the side walls of the transverse grooves up to the running surface of the tire.

The parts of the skin which are present at the radially outer sides of the profile blocks are in contrast worn away after only a few kilometres during the rolling of the tire, so that the underlying tread strip; a section of particularly good tread strip material comes to the fore. The thickness of the skin is thus selected to be as thin as possible in these regions. Normally the skin is made wedge-shaped starting from the wing and going towards the mid-circumferential plane of the tire and has on average for example a thickness in the region of 0.1 to 0.2 mm. In the direction of the mid-circumferential plane of the tire, the skin can, for example, extend somewhat beyond the first circumferential groove. It can however also be made shorter insofar as it only projects into the tire tread.

A further possibility consists in providing strips of material which conduct electricity well at the outer side of the tire, with this material, on the one hand, being in contact with at least one wing and, on the other hand, extending into the tread of the tire. On average, the skin can for example have a thickness in the range from 0.1 to 0.2 mm. In the direction towards the mid-circumferential plane of the tire, the skin can for example extend somewhat beyond the first circumferential groove, it can however also be made shorter insofar as it only projects into the tire running surface.

A further possibility consists of providing strips of material which conduct electricity well on the outer side of the tire, with this material, on the one hand, standing in contact with at least one wing and, on the other hand, extending into the tread of the tire. These strips can be guided transversely over the entire width of the tire from wing to wing or, starting from one wing, can only extend a short amount into the tire tread. In the circumferential direction of the tire one strip is again adequate for the above-named reasons, although a plurality of strips can be advantageous.

A strip extending over the entire tire circumference can however also be present which covers over one of the wings and the adjoining region of the tread strip. In this way a good electrical conduction and a uniform rolling of the tire is ensured. The strip preferably ends shortly above the radially inner edge of the wings pointing to the bead. In this way separating effects or crack formations are avoided.

In accordance with an embodiment of the invention the strips consists of a rubber mixture which conducts electricity well. The strips can preferably be so laid on the tread strip prior to the molding of the tread pattern that they cover over at least one later-molded groove section which extends transversely or obliquely to the circumferential direction of the tire up to one of the wings. In this way, technical manufacturing advantages can be achieved on the one hand. On the other hand, it is hereby also ensured that the electrical conductivity is also maintained during the wear of the tread pattern since the strip is pressed during the molding of the tread pattern along the side walls of the inclined or transverse grooves down to and into the base of the groove and the electrical connection between the wing and the tread surface of the tire thus remains intact. The thickness of a strip of this kind can, for example, amount to 0.25 mm and the strip can extend in the transverse direction of the tire starting from the wing up to the start of the first circumferential groove. This has in particular advantages during a preforming of the circumferential grooves prior to the final molding of the tire profile.

In accordance with a further design of the invention, a colored layer of good electrical conductivity is applied at least section-wise to the outer surface of the finished molded tire, with the colored layer covering over at least one groove section extending transversely or obliquely to the circumferential direction of the tire. The dissipation of electrical charge from the vehicle bodywork via the wings to the road is ensured through this electrically conductive colored layer. The colored layer can preferably simultaneously serve as color coding for the tire. This has the advantage that, for the manufacture of a tire of this kind, no additional method step is necessary when compared with conventional tires.

BRIEF DESCRIPTION OF THE INVENTION

An embodiment of the invention is shown in the drawing and will be described in the following. There are shown:

FIG. 1, a vehicle tire in accordance with the invention in cross-section;

FIG. 2, a schematic illustration in cross-section of a possible arrangement of the tread base layer and of the tread strip prior to molding of the tread pattern;

FIG. 3, a variant of FIG. 2;

FIG. 4, the variant of FIG. 3 after the molding of the tread pattern and seen in plan view;

FIG. 5, the same variant in cross-section after molding of the tread pattern;

FIG. 6, a plan view of a further variant with a molded tread pattern;

FIG. 7, the variant of FIG. 6 in cross-section;

FIG. 8, a plan view of a further variant with a molded tread pattern;

FIG. 9, the variant of FIG. 8 in cross-section;

FIGS. 10a to 10c, the same variant prior to the molding of the tread pattern;

FIG. 11, an illustration of further variants in plane view;

FIG. 12, an illustration of these variants in cross-section;

FIG. 13, a schematic illustration of another embodiment of the invention in cross-section;

FIG. 14, a schematic illustration of a further embodiment of the invention in cross-section; and FIG. 15, a schematic illustration of yet another embodiment of the invention, likewise in cross-section.

DETAILED DESCRIPTION OF THE INVENTION

Figure 1:
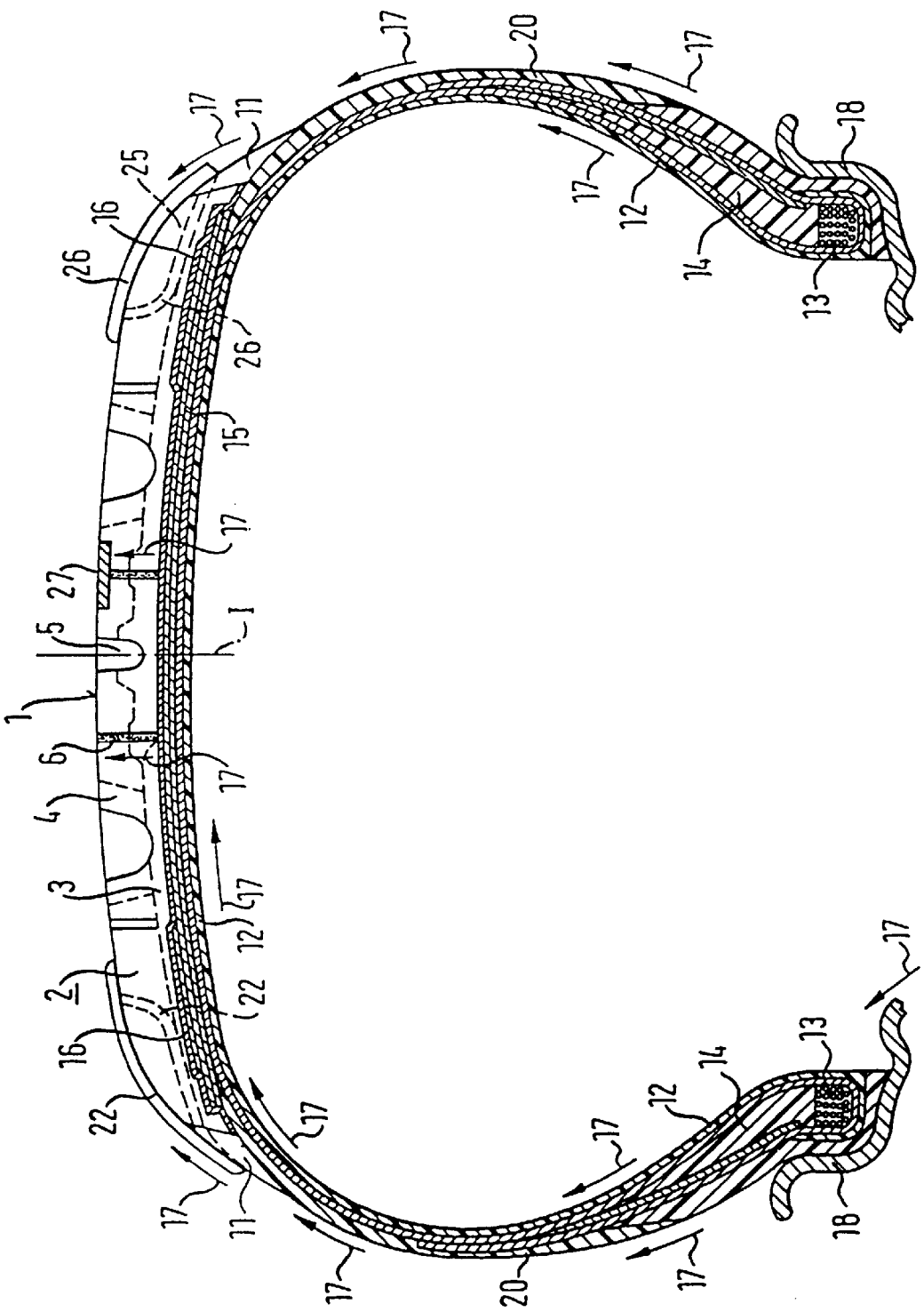

FIG. 1 shows a pneumatic tire formed in accordance with the invention. This vehicle tire is a radial tire with a tread strip 2 forming a tire tread 1 beneath which a tread base layer 3 is present. The tread strip 2 and the tread base 3 jointly form the so-called "protector" of the tire which covers over the sub-structure of the tire towards the outside.

The sub-structure of the tire consists of a radially inwardly disposed carcass 12 and two bead rings 13 with bead apexes 14. The ends of the carcass 12 are turned over around the bead rings 13 and the bead apexes 14 for the anchorage of the carcass. At the two axially outer sides of the tire the latter is closed off by side parts 20. In the transition region between the side parts 20 and the tread strip 2, the tire has tire elements 11 which are termed wings. Moreover, with a radial tire, a breaker 15, for example of several steel cord breaker plies, and a breaker cover 16, for example in the form of nylon bandages are present between the tread base layer 3 and the carcass 12. The tire tread 1 is of a profiled shape with raised tread pattern regions 4 and tread pattern recesses 5. Arrows 17 in FIG. 1 finally schematically represent the flow of an electrical charge from the bodywork, which is here only represented by the rim section 18, to the tire tread 1.

Figure 2:
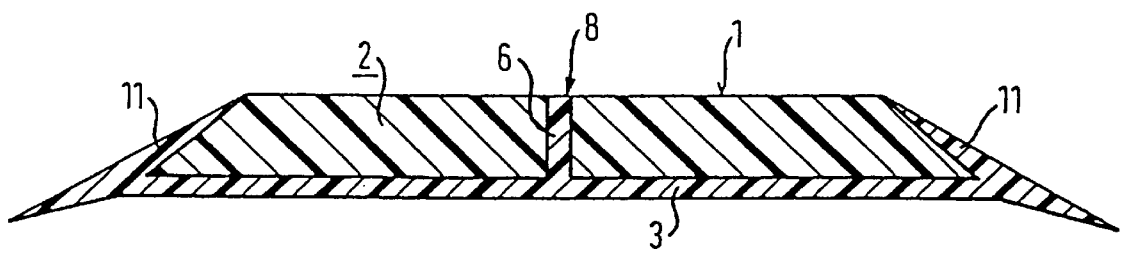

In FIG. 2, it is schematically illustrated how the tread base layer 3 can extend through the tread strip 2 into the tire running surface 1. All unimportant details have been omitted from this illustration. The tread pattern has not yet been formed. In the variant of FIG. 2 an extension or part 6 of the tread base layer 3 penetrates through the tread strip 2 in the middle tire region 8 while, in the variant illustrated in FIG. 3, a part 6 of the tread base layer 3 is led through the tread strip 2 up to the tire running surface 1 in each of the shoulder regions 9 of the tire.

Figure 4:
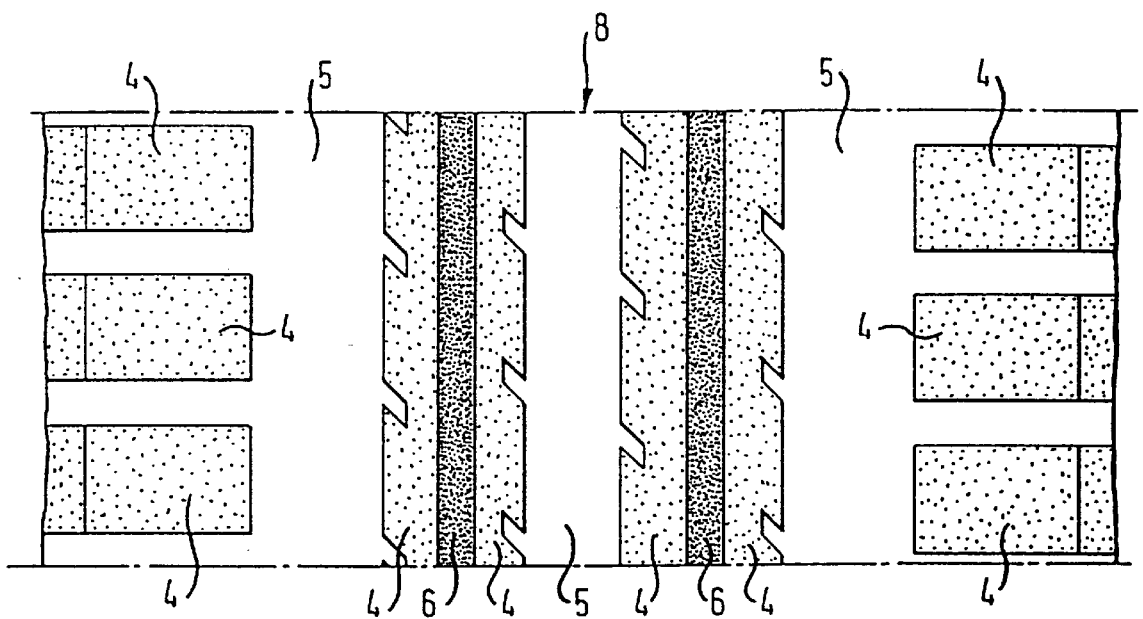
Figure 5:
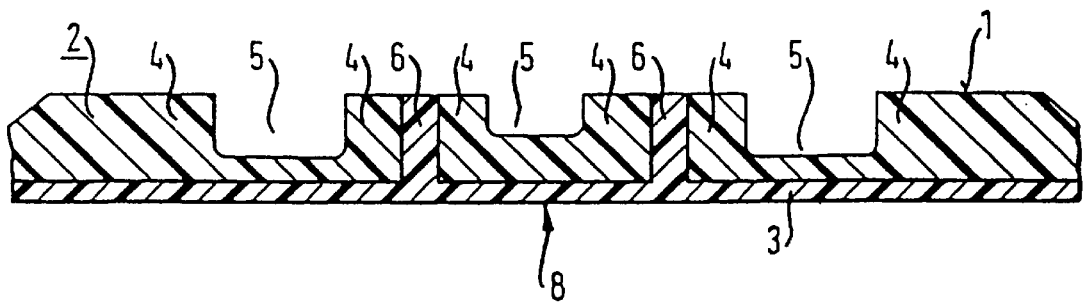

FIG. 4 and 5 show a variant in which, in the middle region 8 of the tire, parts 6 of the tread base layer 3 are led through the tread strip 2 at two positions. As one recognizes from the plan view of FIG. 4, these parts 6 extend over the full circumference of the tire. Both parts 6 are thereby located, as one likewise sees, completely within raised tread pattern regions 4.

Figure 6:
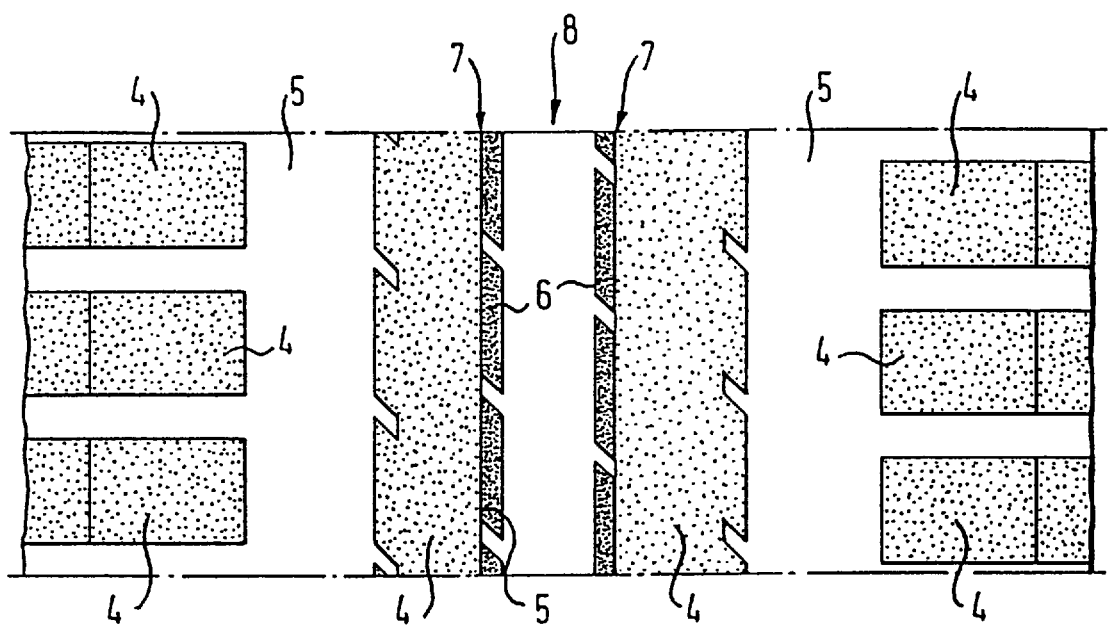
Figure 7:
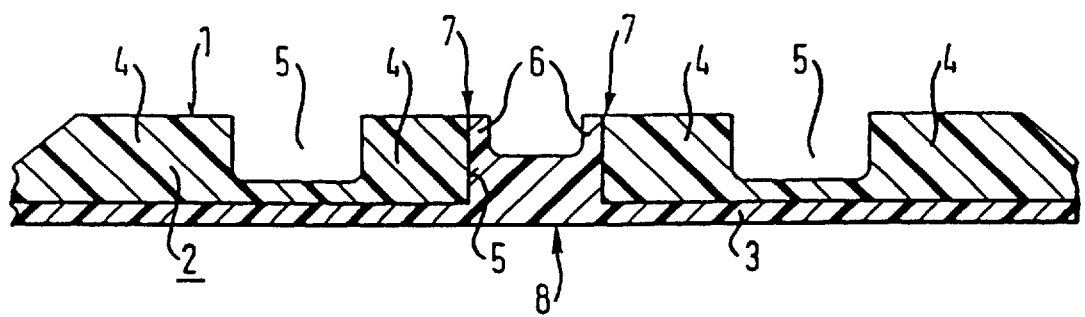

In the variant of FIGS. 6 and 7, a part 6 of the tread base layer 3 is again led through the tread strip 2 in the central region of the tire. In this variant, the part 6 of the tread base layer is however arranged in the transition region 7 between raised tread pattern regions 4 and the tread pattern recess 5 disposed at the center of the tire. The entire tread pattern recess 5 can thereby be provided, as illustrated, in material of the tread base layer 3. In this variant, the part 6 of the tread base layer 3 which is led up to the tire running surface 1 is interrupted in the circumferential direction of the tire as can be seen in FIG. 6.

Figure 8:
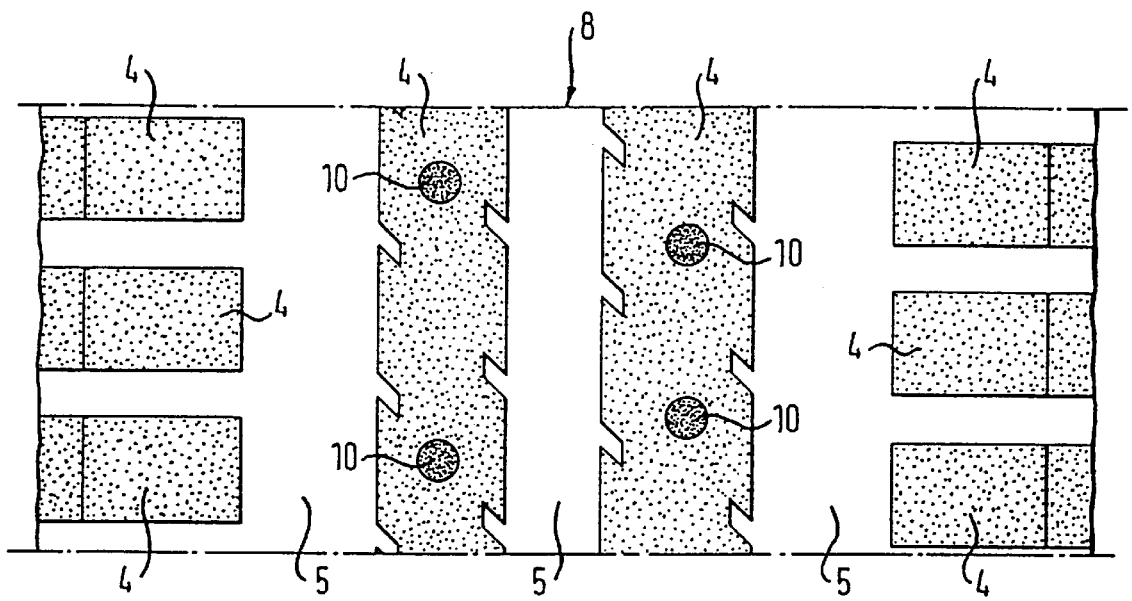
Figure 9:
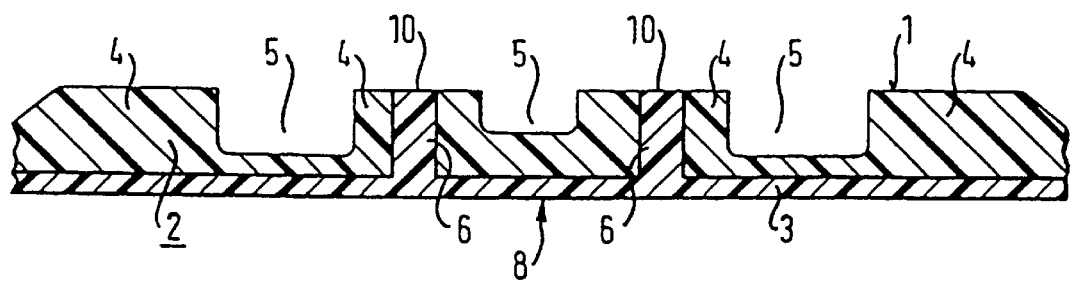

In the variant shown in FIGS. 8 to 10, the tread base layer 3 is led through the tread strip 2 up to the tire running surface 1 only in quasi point-like regions 10. These point-like regions 10 in turn lie fully within raised tread pattern regions 4. It is, however, likewise possible to provide them in transition regions 7 between raised tread pattern regions 4 and tread pattern recesses 5.

Figure 10A:
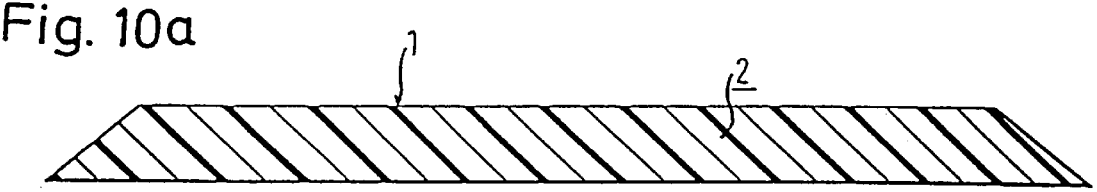
Figure 10B:
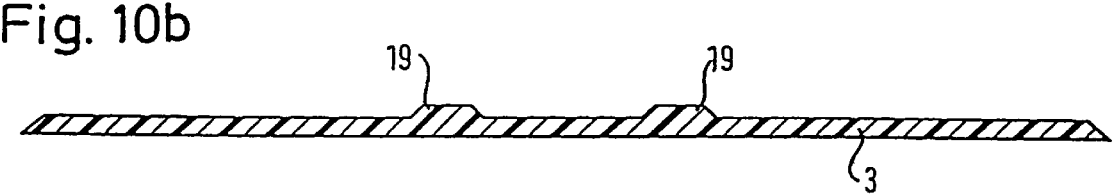
Figure 10C:
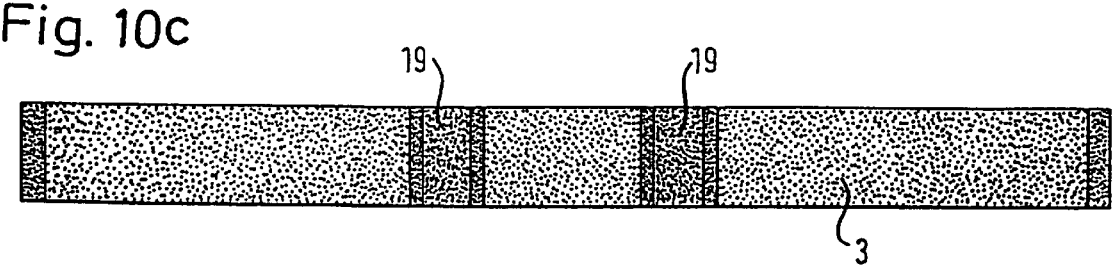

In FIG. 10a, 10b, and 10c, it is schematically illustrated how the design of the parts 6 of the tread base layer 3 which extends through the tread strip 2 can take place. FIG. 10a shows a cross-section through the tread strip 2, FIG. 10b a cross-section through the tread base layer 3 and FIG. 10c a plan view of the tread base layer 3, in each case before the molding of the tread pattern 4, 5. FIG. 10b and 10c show that relatively minor material accumulations can suffice in order to bring about a penetration of the tread strip 2 up to the tire running surface 1 in the regions in which a penetration of the tread strip 2 by the tread base layer 3 is to take place. The material accumulations consist in the illustrated example of thickened portions 19 of the tread base layer 3 which are of trapezoidal shape in cross-section. During the molding of the tread pattern these material collections are intentionally deformed by the flow of material in such a way that they extend through the tread strip 2 up to the tire running surface 1.

Figure 11:
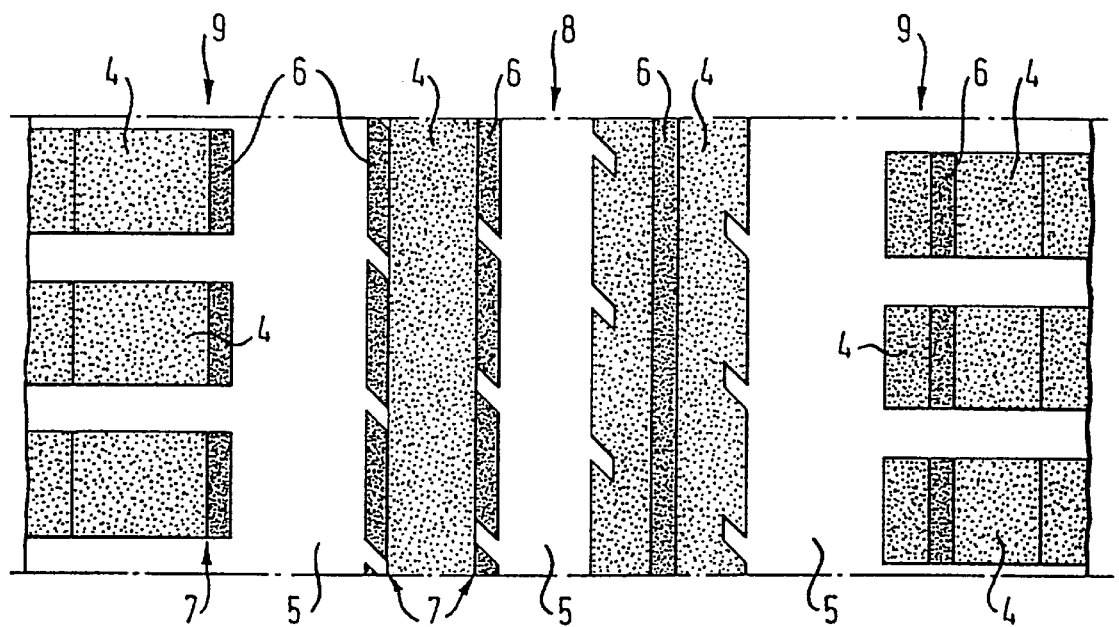
Figure 12:
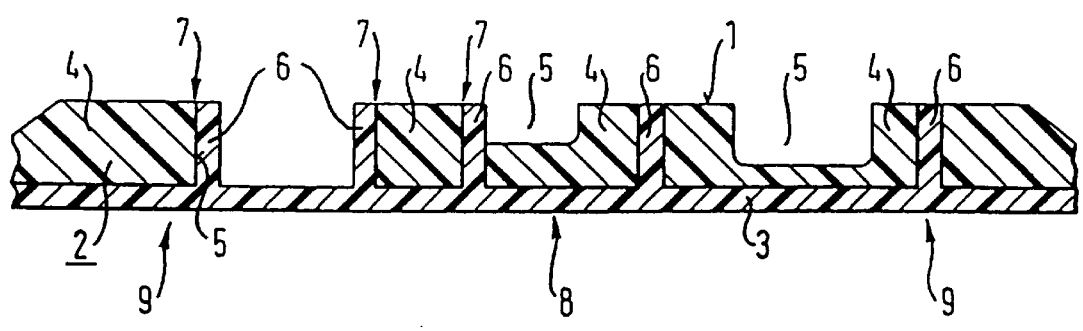

FIGS. 11 and 12 show further possibilities of the arrangement of the parts 6 of the tread base layer 3 which extend through the tread strip 2. These can accordingly be provided in the central region 8 of the tire or in the shoulder regions 9 of the tire, completely within raised tread pattern regions 4 or in transition regions 7 between raised tread pattern regions 4 and tire recesses 5 and also over the entire tire circumference or only over parts of the latter. It is always important that a contact is produced between the road and the tread base layer 3 which is also not lost during wearing down of the tread pattern.

Figure 13:
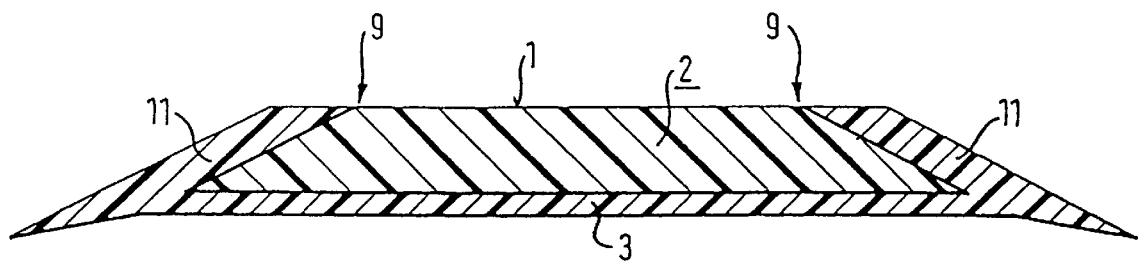

FIG. 13 shows in schematic illustration another embodiment of the invention in which the wings 11 are extended so far towards the mid-circumferential plane I of the tire that they form a part of the tire tread 1. The tread strip is then made correspondingly narrower. The extension of the wings 11 can also take place in different manner, thus these can extend over the entire tire circumference up to and into the tire running surface 1 or however only sectionwise.

Figure 14:
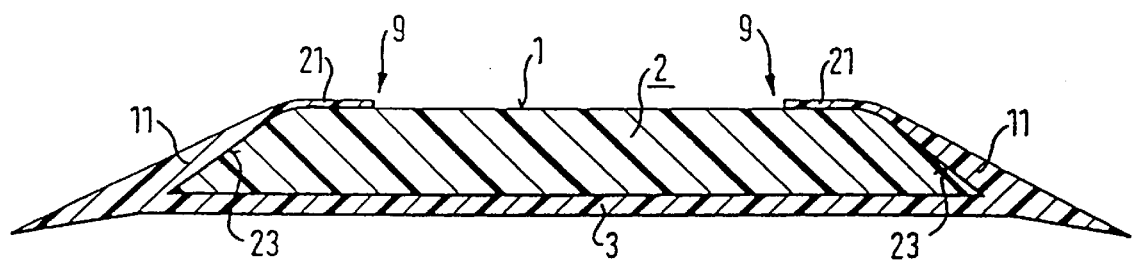

The extension of the wings 11 into the tire running surface or tread 1 can however also take plane in the manner shown in FIG. 14. In this design a (thin) skin 21 of the material of which the wings 11 consist extends in each case, starting from the wings 11 which are otherwise formed in customary manner, in the direction towards the mid-circumferential plane I of the tire up to and into the tread surface 1. Such thin skins 21 can in particular be generated during the joint injection molding of the tread strip 2 and the wings 11, whereby, through suitable dimensioning of the boundary surface 23 between the wing 11 and the tread strip 2, an overlap is achieved which extends onto the tire tread 1. The wing material floods during injection molding of the tread strip material onto the other side of the tire and thereby forms a part of the tread 1.

Figure 3:
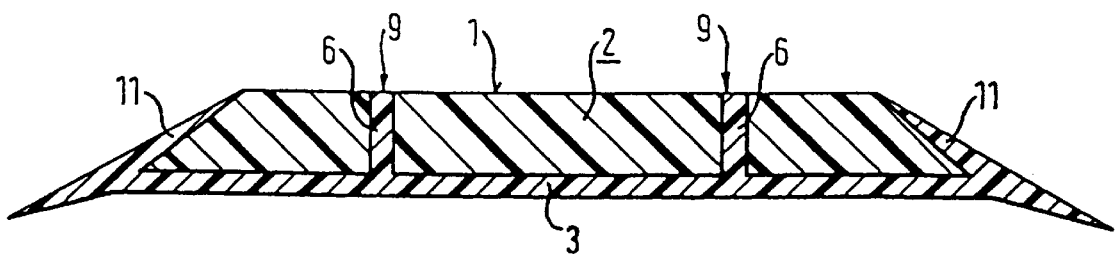

Furthermore, instead of the wings themselves being extended, strips 22 of material which conduct electricity well can be provided which connect wings 11 of a customary design, such as is for example illustrated in FIGS. 2 and 3, with the tread surface 1.

Figure 15:
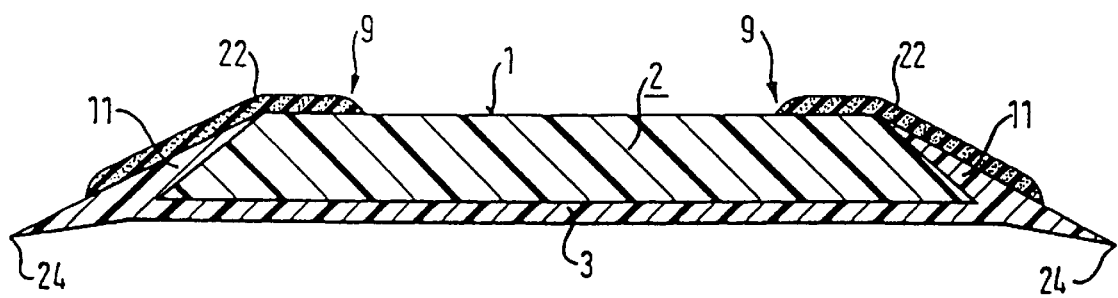

A design of this kind is illustrated in FIG. 15. Here rubber strips 22 which extend in the circumferential direction of the tire are present in the transition region between the wings 11 and the tread strip 2. The rubber strips 22 extend, on the one hand, to shortly above the radially inner edge of the wings 11 and, on the other hand, extend up to and into the tire running surface 1 and thus cover over both the wings 11 and also the tread strip 2. The extent in the direction towards the mid-circumferential plane I of the tire is selected so that at least one later molded groove section 25 extending transversely or obliquely to the circumferential direction of the tire up to one of the wings 11 (see FIG. 1) is covered over, so that the strip 22 is pressed into this groove section 25 during molding of the tread pattern and lines the side walls and the base of the groove. In this manner the electrical connection between the tire running surface 1 and the wings 11 is maintained even when the tread pattern wears away. The sections of the strip 22 present at the outer sides of the raised tread pattern region 4 are in contrast worn away during use of the tire after a few kilometres so that the tread strips 2 lying beneath them are exposed.

Finally, as shown in FIG. 1, a colored layer 26 of good electrical conductivity can also be applied to the outer side of the tire and connect the tread surfaced 1 with at least one wing 11.

Another embodiment of the invention which is likewise illustrated in FIG. 1 consists of molding strips 27 of material of good conductivity into the tread strip 2 which can then, in particular, be electrically connected with the tread base layer 3.

As one can see with reference to the drawing it is always ensured in all the illustrated embodiments that the tread base layer 3 enters into contact at least once per tire revolution with the road via the part 6 which is led through the tread strip 2 and which extends up to the tire running surface 1, or via the wings 11, or via a tire element 22 or 27 which is connected with a wing 11 or with the tread base layer, or via the colored layer 26 which is connected to one wing. At this instant, an electrical connection then exists between the vehicle bodywork and the road so that electrical charge can flow to the road in the manner illustrated in FIG. 1. Electrostatic charging up of the bodywork and the disadvantages which are associated therewith can thus be effectively avoided. At the same time the particularly advantageous characteristics of the silica tread strip are retained, since only minor parts of the tread strip 1 are made of a different rubber mixture. The tire of the invention thus has the good characteristics of a tire with silica tread strips, without having its disadvantages.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described our invention what we claim is:

1. A method of manufacturing a tire comprising the steps of:

forming a tread strip and a tread base layer having a protrusion on a surface thereof, the protrusion defining a thickened portion of the tread base layer, assembling the tread strip and the tread base layer to a tire sub-structure, an inner radial face of the tread base layer adjoining the tire sub-structure and an outer radial surface of the tread strip forming the running surface of the tire, wherein the tread strip is formed from a material comprising silica and having poor electrical conducting property, and each of the tread base layer and the tire sub-structure is formed from a material having good electrical conducting property, and molding the tread strip to form a tire tread pattern, wherein, during molding, material from the thickened portion of the tread base layer is deformed such that the deformed material of the tread base layer extends through the tread strip up to the tire running surface and thereby forms at least one extension of the tread base layer.

* * * * *